United States Patent
Craddock et al.

(10) Patent No.: US 9,185,064 B2
(45) Date of Patent: Nov. 10, 2015

(54) INTERACTIVE EMAIL

(75) Inventors: Richard S. Craddock, San Francisco, CA (US); Ken H. Chin, Redwood City, CA (US); David J. Cheng, Cupertino, CA (US); Scott Isaacs, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 361 days.

(21) Appl. No.: 12/688,479

(22) Filed: Jan. 15, 2010

(65) Prior Publication Data

US 2011/0179362 A1 Jul. 21, 2011

(51) Int. Cl.
G06F 3/0482 (2013.01)
G06Q 10/10 (2012.01)
H04L 12/58 (2006.01)

(52) U.S. Cl.
CPC .............. H04L 51/08 (2013.01); G06Q 10/107 (2013.01); G06F 3/0482 (2013.01); G06Q 10/10 (2013.01); G06Q 10/109 (2013.01); H04L 12/581 (2013.01); H04L 51/10 (2013.01); H04L 51/18 (2013.01)

(58) Field of Classification Search
CPC ...... H04L 12/581; H04L 51/10; G06Q 10/10; G06Q 10/107; G06Q 10/109; G06F 3/0482
USPC ........................................................ 715/752
See application file for complete search history.

(56) References Cited

U.S. PATENT DOCUMENTS

| 6,606,644 | B1 | 8/2003 | Ford et al. |
| 6,704,771 | B1 | 3/2004 | Gough |
| 6,965,926 | B1* | 11/2005 | Shapiro et al. ................. 709/219 |
| 7,512,659 | B2 | 3/2009 | Keohane et al. |
| 7,865,394 | B1* | 1/2011 | Calloway et al. ............. 705/14.4 |
| 2002/0078158 | A1* | 6/2002 | Brown et al. .................. 709/206 |
| 2002/0107931 | A1 | 8/2002 | Singh et al. |
| 2003/0212902 | A1* | 11/2003 | van der Made ............... 713/200 |
| 2005/0010646 | A1* | 1/2005 | Shiina ........................... 709/207 |
| 2005/0027779 | A1 | 2/2005 | Schinner |
| 2005/0038861 | A1* | 2/2005 | Lynn et al. .................... 709/206 |

(Continued)

FOREIGN PATENT DOCUMENTS

| WO | 0052551 | 9/2000 |
| WO | 2009108387 A1 | 9/2009 |

OTHER PUBLICATIONS

"11 Ways Computer Viruses Are Spread," retrieved on Aug. 18, 2013, from http://antivirus-software.topchoicereviews.com/11-ways-computer-viruses-are-spread_216.html using the version captured on Dec. 2, 2008, from www.archive.org.*

(Continued)

*Primary Examiner* — Eric J Bycer
(74) *Attorney, Agent, or Firm* — Tom Wong; Danielle Johnston-Holmes; Micky Minhas

(57) ABSTRACT

A system and method are disclosed for providing an extensible email having rich, interactive browser capabilities. The system includes a service provider for receiving extensible emails from a third party platform and presenting the emails to a user's computing device. The extensible email includes URL metadata which allows a mail user agent to fetch and run code from a third party server in order to generate the extensible email. A secure sandbox ensures that the third party code does no damage to the service provider system or the user's computing system.

11 Claims, 10 Drawing Sheets

(56) References Cited

U.S. PATENT DOCUMENTS

| | | | |
|---|---|---|---|
| 2005/0044003 A1* | 2/2005 | O'Keeffe et al. | 705/26 |
| 2005/0060341 A1* | 3/2005 | Shiina | 707/102 |
| 2005/0193369 A1* | 9/2005 | Brumme et al. | 717/106 |
| 2006/0020548 A1 | 1/2006 | Flather | |
| 2006/0064469 A1* | 3/2006 | Balasubrahmaniyan et al. | 709/218 |
| 2006/0150256 A1* | 7/2006 | Fanton et al. | 726/27 |
| 2006/0259763 A1* | 11/2006 | Cooperstein et al. | 713/166 |
| 2007/0271129 A1 | 11/2007 | Dutton et al. | |
| 2008/0127292 A1* | 5/2008 | Cooper et al. | 726/1 |
| 2008/0147814 A1* | 6/2008 | Damm et al. | 709/206 |
| 2008/0163359 A1* | 7/2008 | Conti | 726/17 |
| 2009/0013053 A1* | 1/2009 | Wehner et al. | 709/206 |
| 2009/0030774 A1* | 1/2009 | Rothschild et al. | 705/10 |
| 2009/0094313 A1 | 4/2009 | Feng | |
| 2009/0100332 A1* | 4/2009 | Kanjilal et al. | 715/235 |
| 2009/0138937 A1* | 5/2009 | Erlingsson et al. | 726/1 |
| 2010/0024036 A1* | 1/2010 | Morozov et al. | 726/26 |
| 2011/0066692 A1* | 3/2011 | Ciancio-Bunch et al. | 709/206 |
| 2011/0145926 A1* | 6/2011 | Dalcher et al. | 726/26 |
| 2012/0042025 A1* | 2/2012 | Jamison et al. | 709/206 |

OTHER PUBLICATIONS

"How does a computer get infected with a virus or spyware?" retrieved on Aug. 18, 2013 from http://www.computerhope.com/issues/ch001045.htm using the version captured on Apr. 11, 2008 from www.archive.org.*

Surendran, "Automatic Discovery of Personal Topics to Organize Email", Microsoft Research, 2nd Conference on Email and Anti-Spam, Jul. 2005, http://www.ceas.cc/papers-2005/145.pdf.

"Email Marketing Solutions (Formerly EmailLabs)", website, © 2009 Lyris Inc.™, http://www.lyris.com/solutions/lyris-hq/email-marketing/.

Hendrickson, "Fuser: Manage All Your Email and Social Networking Messages in One Place", Sep. 25, 2007, http://www.techcrunch.com/2007/09/25/fuser-manage-all-your-email-and-social-networking-messages-in-one-place/.

Bellotti, "Taking Email to Task: The Design and Evaluation of a Task Management Centered Email Tool", Conference on Human Factors in Computing Systems, Proceedings of the SIGCHI conference on Human factors in computing systems, pp. 345-352, 2003, ACM, New York, NY.

European Search Report dated Mar. 5, 2014 in European Patent Application No. 11733268.4.

Wikipedia, "Java virtual machine", Dec. 30, 2009, 6 pages.

Response to Official Communication filed Sep. 30, 2014 in European Patent Application No. 11733268.4.

"Office Action and Search Report Issued in Chinese Patent Application No. 201180006005.X", Mailed Date: Mar. 2, 2015, 22 Pages.

Response to Office Action filed Jul. 14, 2015, and partial English translation, in Chinese Patent Application No. 201180006005X.

* cited by examiner

Fig. 3

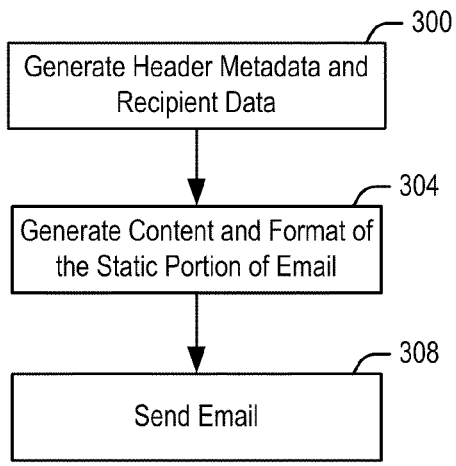

- 300 Generate Header Metadata and Recipient Data
- 304 Generate Content and Format of the Static Portion of Email
- 308 Send Email

Fig. 4

From: CustomerService@ship.com
To: Christina@ISP.com
Subject: Re: Order Shipment
Date: Sat, 17 Dec 2009 09:55:06 -0600

<div
310 { mail:lvcsrc = "http://www.ship.com/ordershipment?id=112&token=s11h5s"
mail:lvexp = "Fri, 15 Jan 2010 05:00:00 UTC"
mail:lvauthreq = "none">

312 [Default Static HTML content for shipment info]

</div>

Fig. 5

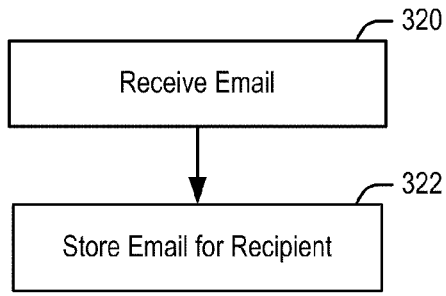

- 320 Receive Email
- 322 Store Email for Recipient

*Fig. 10*

From: NoReply@Netflix.com
To: Alan@ISP.com
Subject: Movie Ratings and Queue
Date: Sat, 17 Dec 2009 09:55:06 -0600

500

<div
mail:lvcsrc =
http://www.netflix.com/ratemovie?id=123151token=s1gkah5sw
mail:lvexp = "Fri, 15 Jan 2010 05:00:00 GMT";
mail:lvauthreq = "true";

[Default Static HTML content for Netflix movie rating info]

</div>

<div
mail:lvcsrc =
http://www.netflix.com/queue?id=123151token=s1gkah5sw;
mail:lvexp = "Fri, 15 Jan 2010 05:00:00 GMT";
mail:lvauthreq = "true";

[Default Static HTML content for Netflix movie queue info]

</div>

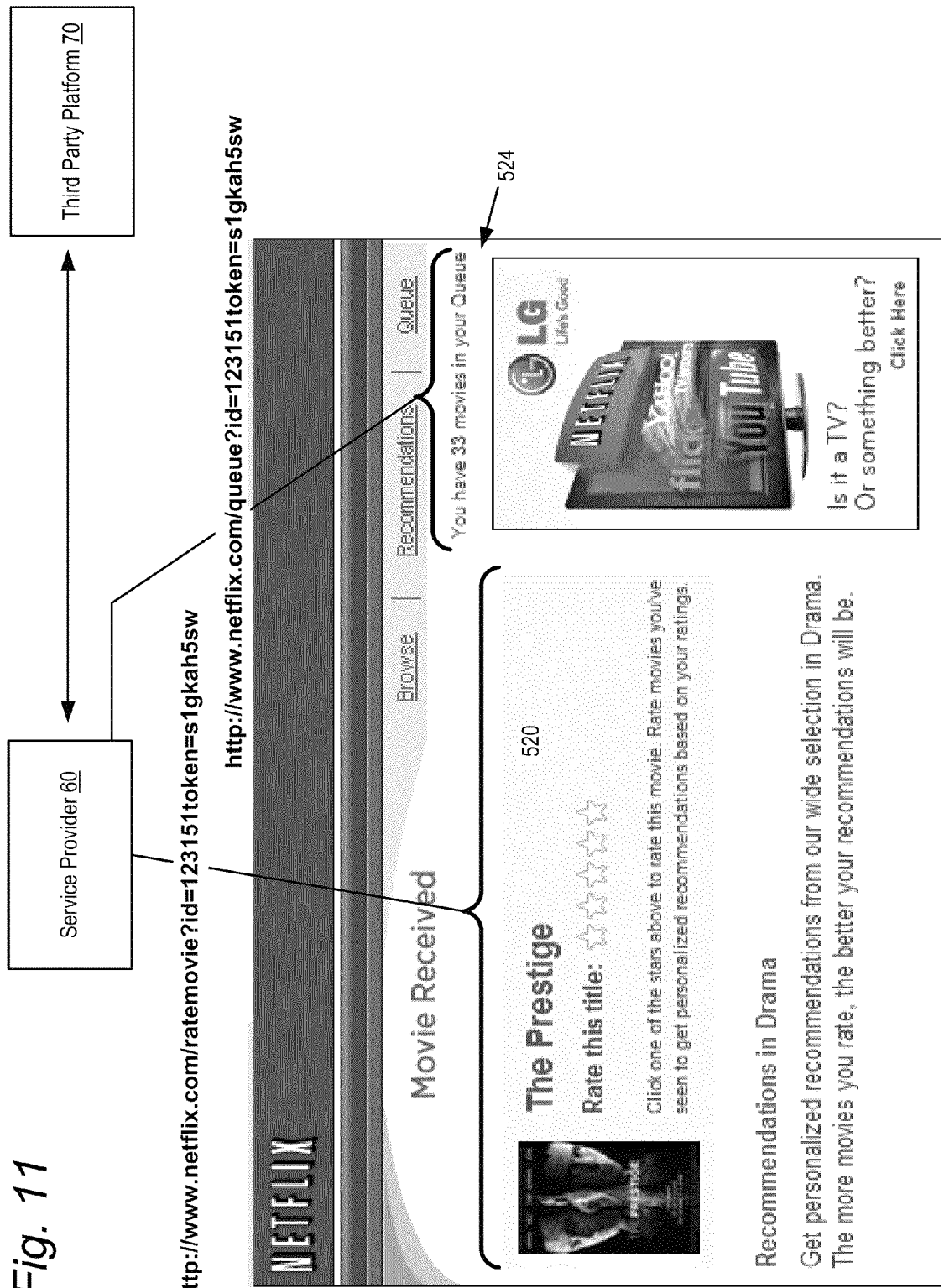

INTERACTIVE EMAIL

BACKGROUND

With the ubiquity of the Internet and computer networks, electronic mail (email) has become the preferred method of communicating textual, graphical and other digital information. Unlike conventional postal mail, email may arrive at its destination within seconds or minutes of its sending, even where the recipient is across the globe. Moreover, an email may be easily sent to multiple recipients. Most enterprise service providers now support an email application program providing email accounts for its subscribers.

A conventional email system operates using a mail user agent which is a software application program used to send and receive emails. Examples include Outlook® messaging and collaboration client and Hotmail® web-based e-mail service by Microsoft® Corporation, Redmond, Wash. Regardless of whether local or web-based, mail user agents have conventionally not been extensible. That is, conventional mail user agents do not allow significant interactivity with web servers over the World Wide Web. While it is common to embed URL addresses within an email, once a URL is selected, the user is taken from the mail user agent, and the user accesses the selected web server URL via the user's browser. Further interaction with the selected URL is then performed by the browser, outside of the mail user agent.

Some truly extensible mail user agents are known which allow access to a web server from within the mail user agent. However, allowing a web server's script to run within a mail user agent presents security and operational issues for the host computing system (the user's computing device or enterprise service provider). Once run within the mail user agent on the host computing system, a web server's script could potentially impair or interfere with the operation of one or more applications on the host computing system. Worse still, the web server could run malevolent code from within the mail user agent which could infect the host system, steal data, etc. As such, prior art email systems do not allow unrestricted extensible interactivity over the Internet. Instead, such systems set up virtual sub-networks, where those entities wishing to provide interactive content via the extensible email system are prescreened and authenticated. Only then are they admitted to the virtual sub-network and allowed to provide interactive content via the mail user agent.

SUMMARY

The present technology, roughly described, relates to a system and method for providing an extensible email having rich, interactive browser capabilities. The system includes a service provider for receiving extensible emails from a third party platform and presenting the emails to a user's computing device.

The system further includes a mail user agent, either resident on a server of the service provider or run locally on the user's computing device. The mail user agent receives the extensible email which includes a URL (uniform resource locator) within metadata of the extensible email. The mail user agent then contacts and retrieves code from a computing environment designated by the URL.

The system further provides a virtual machine, referred to herein as a sandbox, in which the code retrieved by the mail user agent is examined and run in a secure environment. The sandbox applies one or more policies which define boundaries on how retrieved code may operate on the system. By applying the one or more policies, the sandbox determines if portions of the retrieved code operate outside of these boundaries. In embodiments, the sandbox attempts to reimplement any portion of retrieved code that operates outside of a policy-defined boundary into code that operates within the policy defined boundary.

This system of isolating and evaluating third party code within a secure sandbox allows the present system to receive extensible emails from third party platforms from anywhere over the Internet. In embodiments, all authentication and validation of emails, and the examination of third party code in the sandbox, occurs at the time an email is received or opened. With such a system, no pre-authorized third parties or sub-networks of approved third parties are required. As such, extensible emails may be received from anywhere on the Internet, dynamically authenticated and resolved, and then rendered with an interactive view in accordance with the procedures described above.

BRIEF DESCRIPTION OF THE DRAWINGS

FIG. 3 is a flowchart illustrating the steps for a third party platform to generate and send extensible emails according to the present technology.

FIG. 4 is an illustration of email metadata generated by a third party platform to send an extensible email according to the present technology.

FIG. 5 is a flowchart illustrating the steps for a service provider to receive and store an extensible email.

FIG. 10 is an illustration of email metadata generated by a third party platform to send an extensible email including two interactive views according to the present technology.

FIG. 11 is an illustration of an extensible email including two interactive views generated from the metadata shown in FIG. 10.

DETAILED DESCRIPTION

Figure 1A:
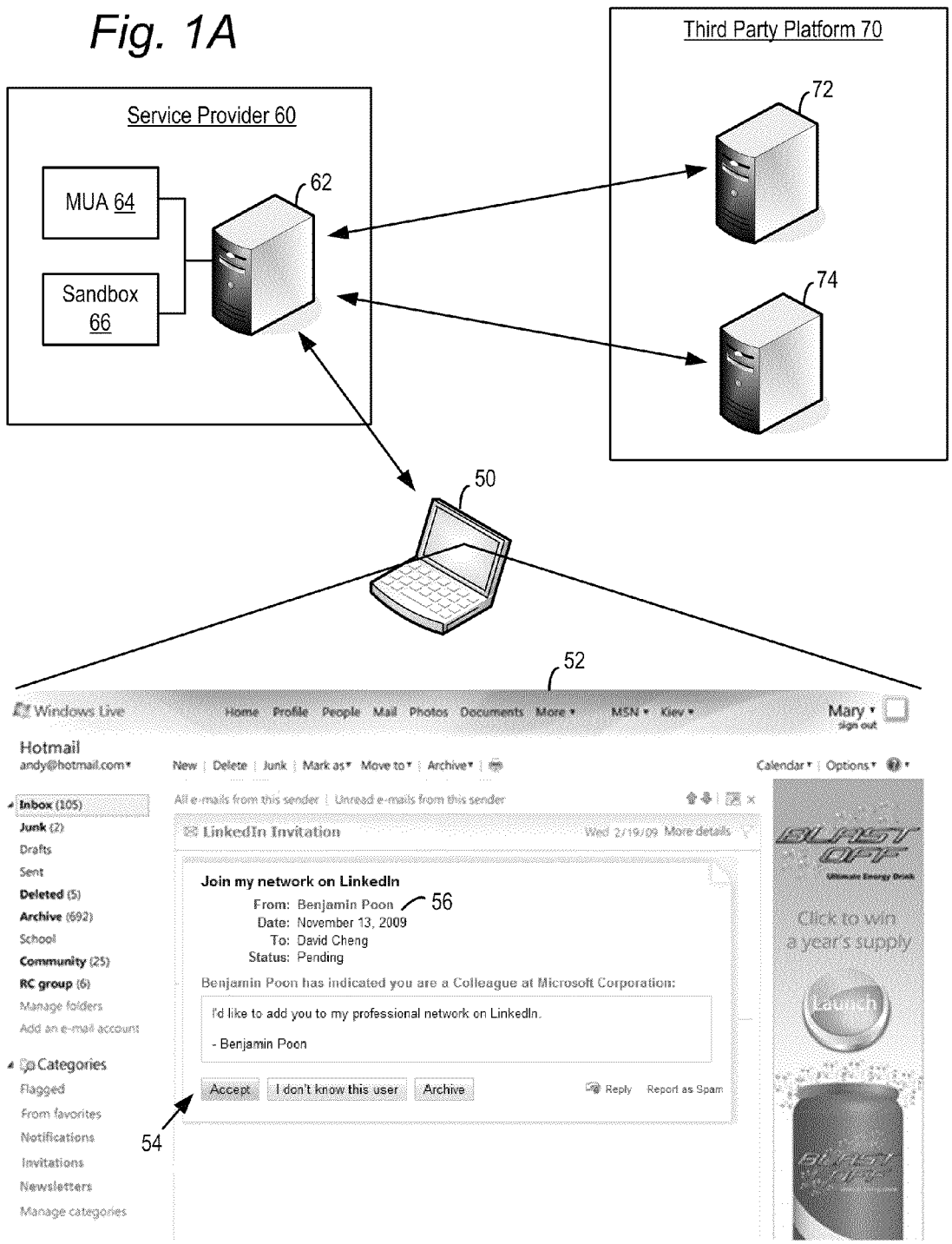
FIG. 1A is a block diagram of a system for generating an extensible email, and an extensible email generated thereby.
Figure 1B:
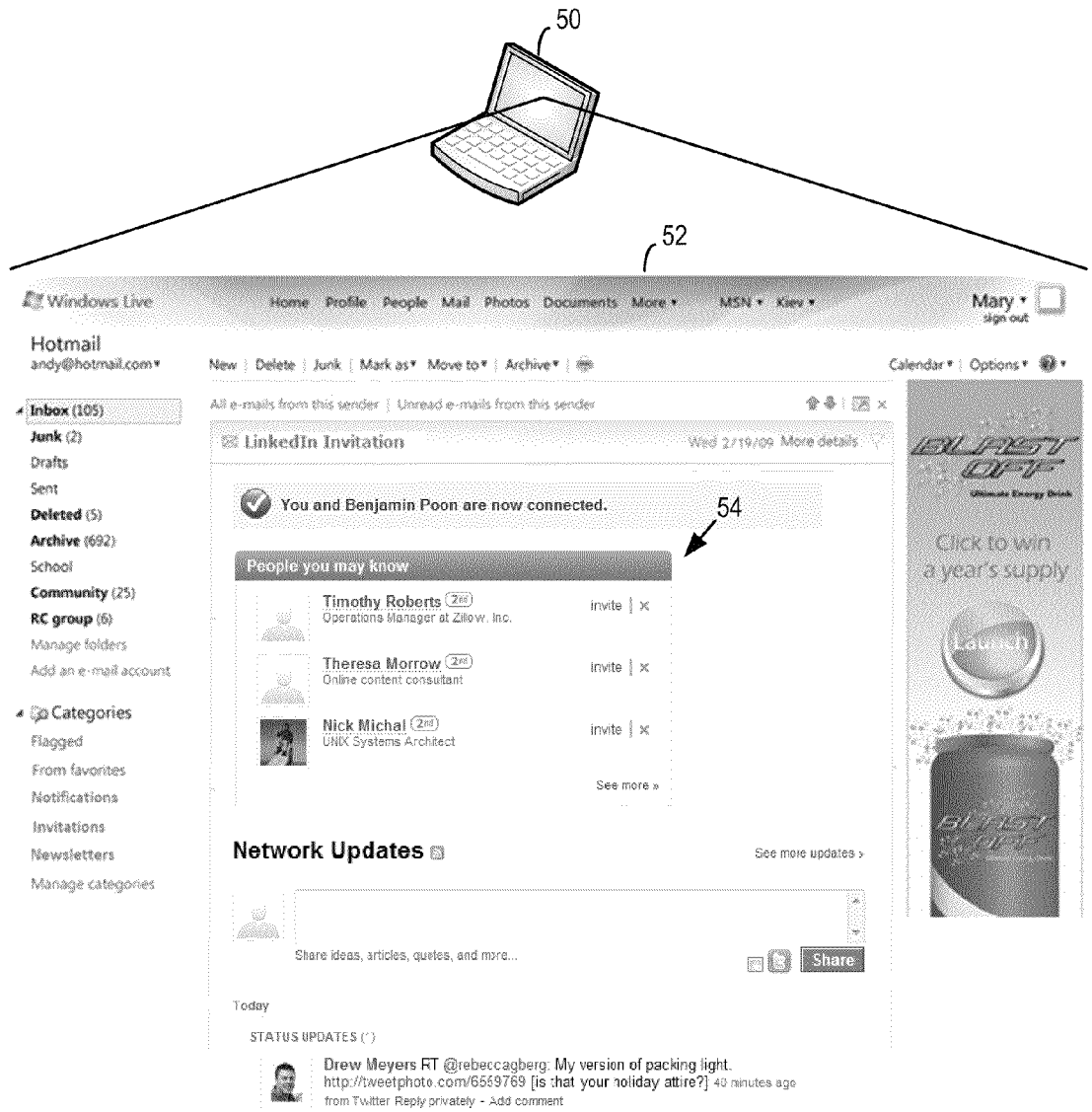
FIG. 1B is a follow-on interactive view to the interactive view shown in FIG. 1A.

The present technology will now be described with reference to FIGS. 1A through 11, which in general relate to a system and method for providing an extensible email having rich, interactive browser capabilities. Referring initially to FIGS. 1A-1B, there is shown an embodiment for implementing the present technology including a user computing device 50, a service provider 60 and a third party platform 70. The service provider 60 includes a mail server 62 for sending email to and receiving email from the subscribing user's device 50. While one server 62 is shown, there may be more than one server in further embodiments.

In an example of the present system, service provider 60 may be an enterprise service provider, and mail server 62 may host a webmail user agent 64 (also referred to herein as mail agent 64), such as for example Hotmail® web-based e-mail service, and a sandbox 66, which is explained below. In further embodiments, the mail user agent 64 may for example be Outlook® messaging and collaboration client located on the user's computing device 50. In this case, mail server 62 may be a mail transfer agent hosted by the user's internet service provider 60. In further embodiments, the email communication client may be resident on any of a variety of computing devices, including for example mobile devices. It is understood that other mail user agents and communications clients may be used in the present system in further embodiments.

In general, the third party platform 70 may be any domain on the Internet that wishes to send extensible emails to users. The third party platform may include a mail server 72 and a web server 74. While one mail server 72 and one web server 74 are shown, third party platform 70 may include more than one mail server 72 and/or more than one web server 74 in further embodiments. Additionally, the email server and web server may be combined within a single server in further embodiments. Moreover, while a single third party platform is shown, there may be many in embodiments.

The platform 70 may send an extensible email via the mail server 72 to one or more users. The email is routed through the mail server 62 of the enterprise service provider 60. The extensible email may include embedded metadata which allows the mail user agent 64 of the service provider to communicate with the third party web server 74 to receive a wide variety of interactive, dynamic and real time information, all within a graphical user interface (GUI) 52 of the user's mail agent 64. It is understood that the above described communication may be made to the third party platform with servers other than web server 74 in embodiments.

Extensible emails may be generated by the third party platform 70 relating to any of a wide variety of topics and services. For example, GUI 52 in FIGS. 1A-1B show an extensible email displayed within the email body upon the user opening the email from the user's inbox. In this example, the extensible email includes an interactive view 54 relating to an invitation to join an online social network. In general, an "interactive view" as used herein is any view presented within an extensible email which is generated from code fetched from the third party sender system upon the user opening the extensible email, as explained in greater detail below. The interactive view 54 may for example include:

dynamic animations and rich multimedia content such as dynamic graphics and videos;
 dynamic webpage layouts;
 real time data, for example user account information stored with the third party platform; and
 dynamic requests for information and feedback.

Other types of dynamic and interactive information may be provided within an interactive view of an extensible email in further embodiments.

Once a user interacts with an interactive view, the third party platform 70 may provide content that can also be an interactive view. For example, if the user interacts with the interactive view 54 in FIG. 1A to accept the networking invitation provided by the interactive view, the mail user agent 64 may contact the third party platform, which may respond with a further interactive view 54 shown in FIG. 1B. Through interaction with the interactive view, a user may be presented with multiple successive screens by the mail user agent 64 each having an interactive view. The further interactive view(s) may come from the same or different third party platform.

The extensible email may further include a static view 56 which may be defined by the sender in the sent email and need not be fetched by the receiving mail user agent 64. In general, a "static view" as used herein may be defined in the third party's sent email as explained below, and may include static text, styles and/or graphics. It is understood that an email may include an interactive view 54 but no static view 56, or an email may include a static view 56 but not interactive view 54.

Extensible emails may be sent from any domain on the Internet, and the GUI 52 shown in FIGS. 1A-1B is one of many possible extensible emails. As a further example, where the third party server 74 stores photo albums or videos, the embedded metadata in the sent email may allow the user to view the photo albums or videos in the user's email inbox, and then add comments which are then stored back on third party server 74. Where the third party platform 70 is a social network, the embedded metadata in the sent email may allow the user to view and comment on friends' profiles, and possibly accept, decline and send invitations. Where the third party platform is a seller, reseller or intermediary for goods and services, the embedded metadata may allow the user to interact with the web server 74 to make purchases, review purchases, account and shipping information, bid on auction items, read product reviews and ratings, get real-time pricing and availability, add products to a wish list, etc. Where the third party platform 70 is an airline or travel agent, the embedded metadata may allow the user to interact with the web server 74 to review or purchase travel reservations, or receive flight arrival/departure information.

The types of extensible emails which may be sent are as varied as the types of goods, services and information that are provided over the World Wide Web. The user interactivity with an extensible email may be performed by the user's mail agent 64 and presented within the body of the extensible email in the Inbox of the user's mail agent 64 as shown in GUI 52. The operation of the present technology to enable this interactivity within a mail user agent 64 is explained below. As used in this detailed description of the present technology, the terms "mail user agent" and "mail agent" are used to describe a software routine, resident in an enterprise service provider 60 or within the user's computing device 50, which perform the email functions of a conventional mail user agent, plus additional browser functions enabling interaction with the third party web server 74 or other third party server.

Each of computing device 50, mail servers 62 and 72 and web server 74 may be comprised of a general computing system environment 100 which is now explained with reference to FIG. 2. The computing system environment 100 is only one example of a suitable computing environment and is not intended to suggest any limitation as to the scope of use or functionality of the system. Neither should the computing environment 100 be interpreted as having any dependency or requirement relating to any one or combination of components illustrated in the exemplary operating environment 100.

In addition to or instead of one or more of the devices described above, the functions of one or more of the above-described devices may be performed by numerous other general purpose or special purpose computing system environments or configurations. Examples of other well known computing systems, environments, and/or configurations that may be suitable for use with the system include, but are not limited to, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices.

Figure 2:
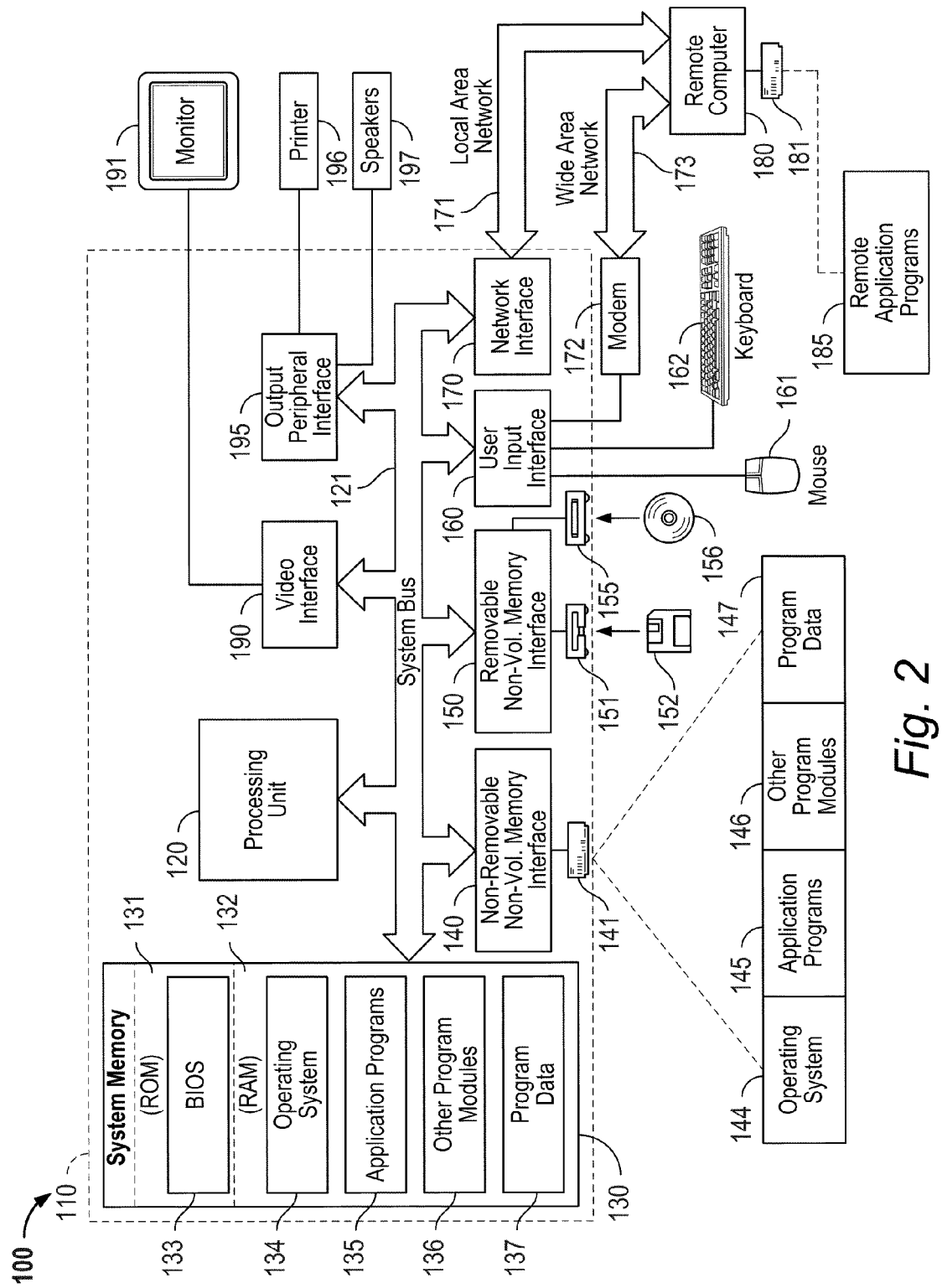
FIG. 2 depicts a block diagram of computer hardware suitable for implementing the present technology.

FIG. 2 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computer 110 may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

The operation of the present system is now further described with reference to FIGS. 3-9. Referring first to the flowchart of FIG. 3, an extensible email is initially generated and sent by the third party platform 70. In accordance with embodiments of the present system, the sender includes metadata in the HTML portion of the extensible email, which is used by the service provider to render the interactive and static views. The metadata may be located in other portions of the sent email in further embodiments, including for example in the header of the email. In step 300, the sender specifies the recipient(s) of the email. The sender may also specify a subject of the email in step 300. FIG. 4 is a sample email including the email sender ("CustomerService@ship.com"), a recipient of the email ("Christina@ISP.com"), a subject and time of the email. As shown in FIG. 4, step 300 further includes the sender adding metadata 310 used to generate the interactive view of the extensible email, and the metadata 312 used to generate the static view of the extensible email.

The metadata used to generate a given interactive view in an email may start and end with an html <DIV> tag. The first field of metadata in the email may be the "mail:lvsrc" field. The designation "mail:lvsrc" is an arbitrary label used by the present system to indicate that what follows is to be used as the URL for the service provider call. In particular, as explained below, upon a user opening an extensible email, the mail user agent 64 will connect with the URL specified in the "mail:lvsrc" metadata field to fetch code that is then used by the mail user agent 64 to generate the interactive view within the extensible email. The URL in the "mail:lvsr" field is provided by the third party platform that is sending the email.

The specified URL may typically point to a web server within the domain of the third party platform 70 that sent the email. However, the URL may point to a different server within the third party platform 70, or to a server outside of the third party platform 70, in further embodiments.

In the example of FIG. 4, the third party platform 70 is a shipping service, and the URL points to code on the shipper's servers which returns the place and time a specific user's merchandise was shipped, which may be shown in an interactive view analogous to the interactive view 54 of FIG. 1. This information may be retrieved by the service provider mail server 62 when the recipient opens the email. As will be appreciated, the information stored on a third party platform 70 server will change from time to time. However, when the user opens an extensible email, the service provider contacts the designated server to retrieve the most up to date information.

There is no need to specify CSS formatting or other layout information in the metadata 310 for the interactive view. This data may be specified by the code stored at the specified URL. However, it is conceivable that formatting and layout information may be provided within metadata 310 for the interactive view of the email in further embodiments.

As shown in FIG. 4, the sender may further specify an expiration date in the metadata 310 beyond which the service provider is not to retrieve the code specified at the URL metadata. Thus, if a user has not retrieved the third party's email until after the expiration date, the email will not display the dynamic portion of the email. The designation "mail:lvexp" is an arbitrary label used by the present system to indicate that what follows is to be used as the expiration date. Thus, in the example of FIG. 4, where the email was sent on Dec. 17, 2009, if the recipient did not retrieve the email by 5:00:00 UTC on Jan. 15, 2010, the interactive portion of the email expired and was not presented to the user. The static portions of the email may still be shown after the expiration date and time.

In embodiments, the expiration specifies that a user must retrieve an email from the service provider 60 by a certain date and time, but as long as it is retrieved before the specified expiration, it may be opened after that time. In further embodiments, an email must be retrieved and opened prior to the specified expiration. In further embodiments, the expiration metadata may be omitted altogether. In such embodiments, the dynamic portion of an extensible email may expire after some predetermined default period of time, or it may not expire at all.

As explained below, a sender may specify multiple interactive views for an extensible email, and a different expiration date may be set for each interactive view. In such embodiments, all interactive views may expire upon the first to expire interactive view. In further embodiments, each interactive view may expire at the different times set for each interactive view.

The third party platform 70 sender may further specify the type of authentication, if any, required by the third party platform before it will allow its code to be accessed and retrieved by the service provider 60 from the third party platform servers. This authentication is different than the security and authentication applied by the service provider 60, explained below, in determining whether it will allow the third party code to be run by the mail user agent 64 within service provider 60. The designation "mail:lvauthreq" is an arbitrary label used by the present system to indicate that what follows is the type of authentication that is required by the third party before allowing access to its servers by the service provider.

In embodiments, there may be no value specified, meaning the third party does not require its own authentication when the call is made by the service provider. Alternatively, the value may be "signed." In this case, the third party platform has requested that, in the call the service provider mail server 62 makes to the third party platform 70 for the code, the service provider must sign the specified URL using a private key and the user's email address. Both of these values are appended to the URL call made by the service provider. The "mail:lvauthreq" field may be omitted in further embodiments.

An additional or alternative authentication mechanism may be implemented using delegated authentication. In such an embodiment, the third party platform provides a user access token for mail user agent to append to the URL. When the third party platform gets this token and it is valid, the third party platform will return the code/data for generating the interactive view. An example of this implementation is using an OAuth handshake. The token is obtained by the mail user agent in a one-time process. When an interactive email is received by the user, the user will be prompted to connect that service with the service provider. If the user chooses, they will go through a series of screens hosted by the third party platform to get the user's credentials. Once the third party platform validates the credentials and that it is coming from the service provider, the third party platform will send the access token to the mail user agent in a secure fashion.

In addition to authenticating the service provider, the third party platform may require additional authentication before it will release subscriber information to the service provider. These additional user authentications are described below.

It is understood that the sender may optionally include additional fields relating to how and under what circumstances its email is to be made extensible for the recipient. For example, a sender may include metadata having an encrypted ID that allows the mail user agent 64 to authenticate the sender as explained below.

As another example, a sender may specify multiple interactive views in an email. In this instance, the sender can create multiple separate URL calls in separate <DIV> sections, each having its own "mail:lvsrc" field. Alternatively, the present system supports an optimization where the content for all interactive portions can be obtained from a single URL call. The designation "mail:lvname" is an arbitrary label used by the present system to indicate that what follows is to be used as a reference to a "mail:lvsrc" field in a different <DIV> section. The following shows sample metadata for a sample sender's email:

```
<div
  mail:lvsrc="http://www.netflix.com/ratemovie?id=123151&token=
  s1gklwoah5sw";
  mail:lvexp = "Fri, 30-Oct-2009 05:00:00 UTC";
  mail:lvauth = "none">
  [Default static HTML content for Netflix info]
</div>
<div mail:lvname = MovieRecommendationModule
  [Default static HTML]
<div>
```

In this example, the "mail:lvname" attribute allows the interactive view "MovieRecommendationModule" to be created using the content obtained from the single "mail:lvsrc" URL in the original <DIV> section. In this example, when the service provider 60 makes a call to the third party server to retrieve the code for the first interactive view, it will append the information from the second interactive view to the end of the first interactive view URL in order to generate the second interactive view.

Either before or after the metadata is specified in the email for the interactive view(s) of an email, the sender may further specify the static view portions 312 of the email in step 304. In the example of FIG. 4, this information would be specified between the brackets where it says "Default Static HTML content for shipment info." The information included here could be the static view 56 information shown in FIGS. 1A-1B (fixed text and/or graphics), together with CSS formatting as to how the static information is to appear. It is understood that FIGS. 1A-1B and 4 are but one of any number of examples of the information that may be included in a static portion of an email.

As explained below, if there is a problem with displaying the interactive view of an email for any reason, the mail user agent 64 should fail gracefully. As used herein, that means that even though the interactive view of the email is not enabled, the static portions specified in the sender's email are still displayed, together with any text and/or graphics that the original sender included in the body of the email.

After the interactive and static view metadata portions of the sender's email are specified in steps 300 and 304, the sender may send the email in step 308. As with conventional emails, the email may be routed using an SMTP server of the third party mail server 72 to the service provider 60 of the recipient (in this case, the recipient is the user of computing device 50). Referring to the flowchart of FIG. 5, the service provider 60 receives the email in step 320, and hands the email off to a POP3 or IMAP server of the service provider mail server 62. The POP3/IMAP server stores the email in step 322 for the recipient to download upon the next subsequent connection by the recipient.

Figure 6:
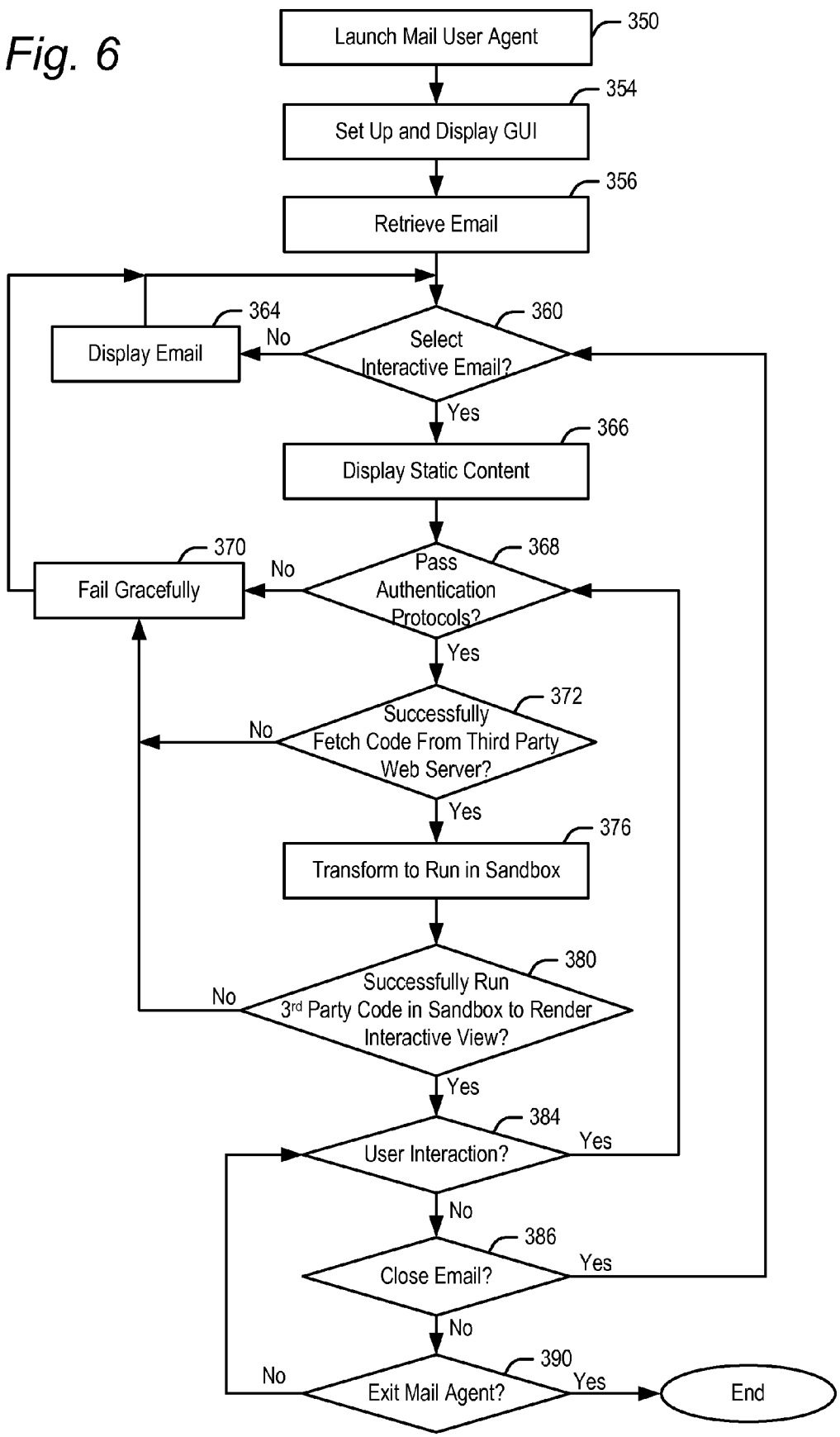
FIG. 6 is a flowchart illustrating the steps of a service provider for presenting an extensible email to a service provider user.

The process for a recipient of an extensible email to view and interact with the email will now be explained with reference to the flowcharts of FIGS. 6 through 9. Referring initially to FIG. 6, the user/recipient launches his or her mail user agent 64 from their computing device 50 in step 350. As indicated above, the mail user agent 64 may run locally on the user's computing device 50, or it may run on the mail server 62 of service provider 60, in which case the user may access it from their computing device 50 via a browser application. Once launched, the mail user agent 64 sets up and displays a GUI in step 354 with the user's inbox, sent folders, banners, advertisements, etc. The mail user agent 64 then retrieves new emails from the POP3/IMAP server of the service provider 60 in step 356.

In step 360, the mail user agent 64 determines whether the user has selected an interactive email, i.e., one with metadata for an interactive view. If the user has selected an email without an interactive view, the agent displays that email in step 364, and then returns to step 360 to look for selection of an email with an interactive view. If it is determined in step 360 that an email with an interactive view was selected, the mail user agent 64 displays any static view associated with the email in step 366 from the email metadata as described above.

Figure 7:
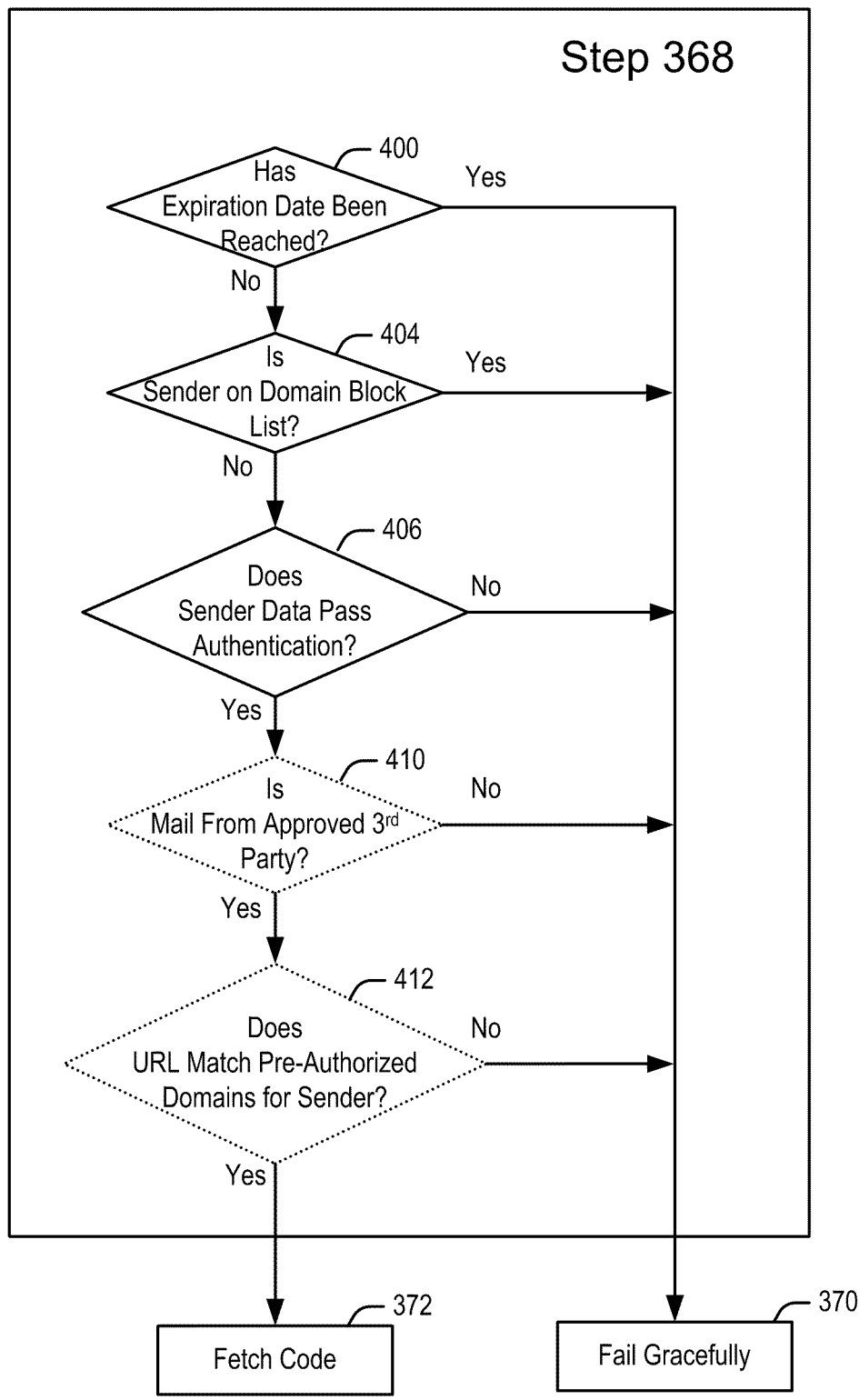
FIG. 7 is a more detailed flowchart of the steps for authenticating and validating a received extensible email.
Figure 8:
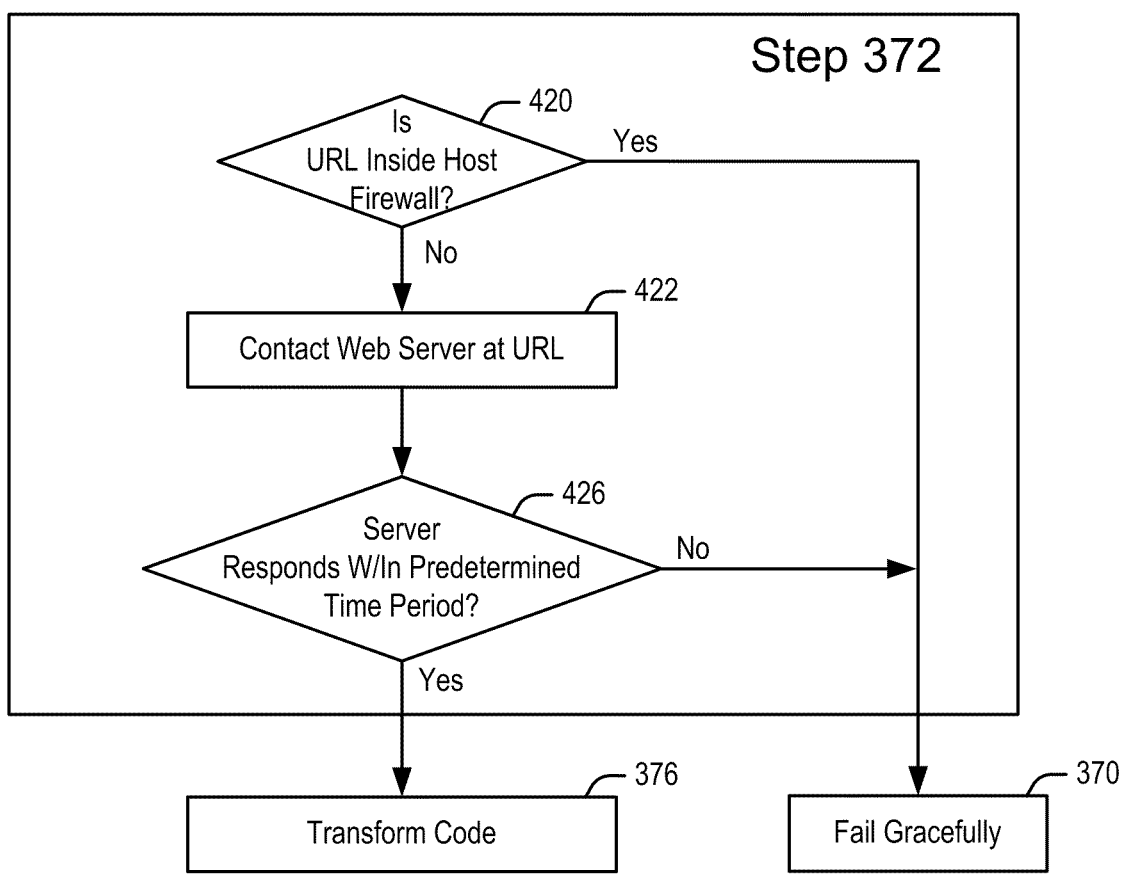
FIG. 8 is a more detailed flowchart of the steps for fetching code from a third party platform to generate an extensible email.

Before displaying the interactive portions of the extensible email, the mail user agent 64 first checks in step 368 whether the extensible email and the third party platform sending the email pass certain authentication and validation protocols. Further details of these protocols according to an embodiment of the present system are shown in the flowchart of FIG. 7.

In step 400, the mail user agent 64 checks whether an expiration date in the email has been reached. As described above, the email sender may include an expiration date after which the interactive portions of the email are disabled. As described, the expiration date may apply to when the email was received. In this case, upon opening the email, the mail user agent 64 may check the receipt date of the email, and if after the expiration date, the interactive portions of the email may fail gracefully in step 370, and only the static portions of the email are displayed. The expiration date may alternatively be when the email is opened. In this case, the mail user agent 64 checks the open date against the expiration date, and fails gracefully in step 370 if the expiration date has passed.

If the expiration date has not passed, the mail user agent 64 checks in step 404 if the third party sender is on a domain block list. A third party sender may be added to the block list for example if it has a history of spamming emails, malicious code or code which has not run compatibly with the mail user agent 64 application. It may also be necessary or desirable to block a domain, in one or more areas, for economic, social or legal reasons. For example, the mail user agent 64 may block YouTube® URL in China due to the laws of that country. Even where a domain is not on a block list, a specific URL from that domain may be on a block list (for one or more of the reasons described above with respect to the domain block list).

Domains/URLs may for example be added manually to this block list by a service provider 60 system administrator. A domain/URL may alternatively be added to the block list automatically if it has failed or caused problems in the mail user agent 64 a predetermined number of times. If a sender's domain/URL matches one of the domains/URLs on the block list, then the email fails gracefully in step 370 and the interactive view may be disabled for that email.

Assuming the sender is not on a block list, in step 404, the mail user agent 64 next authenticates that the sender is in fact who they claim to be in step 406 in order to catch instances of spoofing. The present system may use any of a variety of encrypted identification schemes for this authentication, including for example SenderID and DKIM to validate the email sender. The mail user agent 64 relies on the third party platform mail server 72 to stamp the encrypted ID in a part of the sent email. Using a known encryption key provided by the third party platform 70 to the service provider 60, the mail user agent 64 is able to validate whether or not the sender is authentic.

The mail user agent 64 or some other security application running on the service provider 60 may authenticate an email sender and add the results of the authentication check as a new field in the metadata. In one embodiment, where SenderID is used, the authentication process may add the designation:

X-SID-Result=[attribute]

to the received email, where the attribute is either Pass, Fail, Softfail or temperror. The check must=Pass in order for the mail user agent 64 to contact the indicated third party server. Otherwise, the email fails gracefully in step 370. As indicated, other authentication protocols and other metadata may be used in this authentication step.

Assuming the email passes the authentication step, the mail user agent 64 may then contact the third party platform 70 to fetch the code for the interactive view(s). However, in alternative embodiments, the present system may optionally perform additional authentication steps, indicated with dashed lines in FIG. 7. For example, the present system may optionally employ a white list of pre-approved third party platforms. In this embodiment, the third party platform 70 and service provider 60 would arrange and agree to work together before the third party platform 70 could send extensible emails to users with the service provider 60. In this embodiment, in step 410, the mail user agent 64 may check to ensure that a third party sender is on the pre-approved white list. If not, the email may fail gracefully in step 370.

In the same manner, the service provider 60 may have a white list of pre-authorized domains for a third party platform 70. In such an embodiment, in step 412, the mail user agent 64 may check to ensure that a domain and/or URL listed in the sent email metadata are on the pre-authorized white list. If not, the email may fail gracefully in step 370. In a further embodiment, this white list may be similar to a DNS like system where senders publish the approved URLs that they can call.

It is understood that embodiments of the present technology may operate without one or more of the above-described white list checks. In such embodiments, interactive view 54 may be displayed in all instances where a user's mail user agent allows "links and images" to be displayed. For example, if a sender is in the user's contacts so that links and images from the sender are permitted, interactive views may similarly be permitted. There are a variety of other instances where content from a sender may attains trusted status so that interactive views may be displayed, such as for example where the sender is on a safer sender list or a bonded sender list. In such instances, interactive views may be displayed without some or all of the URL and/or domain white listing described above.

As discussed below, the mail user agent generates an interactive view by creating the virtual machine, or sandbox, that applies one or more policies and determines if portions of the retrieved code operates out of these boundaries. The sandbox ensures that no third party code will impair the operation of the service provider 60 and its users and ensures that no third party code will be able to obtain or tamper with the data of the service provider 60 or its users. This feature, at least in part, allows the present system to receive extensible emails from third party platforms from anywhere over the Internet. All authentication and validation of emails, and checking of third party code, occurs at the time an email is received or opened, and no pre-authorized white lists are required. As such, as indicated above, both of steps 410 and 412 are optional and may be omitted.

The authentication steps 400 through 406, and optionally 410 and 412, are but one embodiment of authentication steps which may be performed to authenticate and validate third party extensible emails. Given the disclosure of the present system, those of skill in the art will appreciate other or alternative authentication and/or validation steps which may be performed.

If a third party email passes the above-described authentication and validation steps, the mail user agent 64 may connect to the URL listed in the mail:lvsrc metadata field. In some instances, the third party platform 70 will require the service provider 60 to sign with a token or other encrypted user authentication data before the third party platform will release the user data at the indicated URL. Those of skill will appreciate various authentication protocols which may be used. In one embodiment, the third party platform may provide an encrypted or obfuscated URL in the sent email. In such an embodiment, the mail user agent 64 may send the encrypted or obfuscated URL to the service provider. The mail user agent 64 may additionally or alternatively append the user's encrypted email address. In a further embodiment, the third party platform may provide a delegated authentication token for mail user agent to append to the URL as described above. The above embodiments can be used separately or used in combination.

One or more of these authentications may be included in the email metadata, preceded by a label such as "lvtoken," "PreAuth token" or "OAuth token." The designations may be used by the present system to indicate differing authentication protocols used by the third party for authentication purposes in releasing the user information to the service provider.

The following is an example of what the mail user agent 64 may return to the third party platform 70, including the target URL, a token and the encrypted user email following the designation "AuthToken":

. . . netflix.com/ratemovie?id=123151&PreAthtoken= s1gklwoah5sw&OAuth-token=123ase945011jlkj.

Those of skill in the art will appreciate other authorization schemes that may be used for this purpose.

Referring to FIG. 6, in step 372, the mail user agent 64 contacts the specified URL to fetch the code that is stored there. The code that is fetched may include executable script (e.g. Javascript®, HTML, CSS) and non-executable script. Executable script is any function call, application programming interface (API) call, or any code that provides a function result. Further details of step 372 are described below with reference to the flowchart of FIG. 8.

The mail user agent 64 first checks in step 420 whether the URL listed in the mail:lvsrc email metadata is inside the service provider firewall. In general, the URL listed in the mail:lvsrc will be for a server within the third party platform 70 that sent the email. In alternative embodiments, the URL listed in the mail:lvsrc email metadata can be for a server outside of the third party platform sender, provided proper authentication of the email sender and listed URL can be established. However, in embodiments, a third party email sender cannot specify a URL behind the firewall of the service provider 60. If the URL points to such a location, the interactive email may fail gracefully in step 370.

Assuming the URL listed in the mail:lvsrc email metadata is not inside the service provider firewall in step 420, the mail user agent 64 may then attempt to connect to the URL listed in the mail:lvsrc metadata field in step 422. If the listed server does not respond within a predetermined period of time in step 426, the interactive email may fail gracefully is step 370. This predetermined period of time may be within 3 seconds, but it may be longer or shorter than that in further embodiments. Assuming the target server responds in a timely manner, the target server returns the code for the interactive view and passes it to a sandbox 66 described below.

As noted in the Background section, there are security and system management risks to the service provider 60 in running third party code within the mail user agent 64. In order to avoid these risks, instead of directly running code fetched from the third party server, the present system employs a sandbox 66 which examines the code and runs it in a secure content holder to ensure the third party code will not disrupt, corrupt, usurp or otherwise adversely affect the service provider 60 and/or the user computing device 50. Details relating to a sandbox which may be used in the present system are described in U.S. published application number 2009/0183227, entitled "Secure Runtime Execution of Web Script Content on a Client," filed May 9, 2008, and in U.S. published application number 2009/0183171, entitled "Secure and Extensible Policy-Driven Application Platform," filed May 9, 2008. These applications have a common inventor with the present application, are assigned to the owner of the present application, and are incorporated by reference herein in their entirety.

In general, the sandbox 66 includes a policy agent having defined policies on how to handle different executable and non-executable scripts of the fetched code. The executable scripts may for example include but are not limited to function calls or API calls that the fetched code may attempt to execute. Embodiments of the policy agent define policies to monitor and/or intercept third party script such that running the script will not exceed boundaries defined in the policies for the script. In this way, the fetched code is prevented from doing harm to the service provider and user systems and data. A policy may further define a dynamic resolution, where possible, of script found to exceed a policy boundary.

Embodiments of the present system may include a transforming step 376, where the code retrieved by the mail user agent is examined and prepared for execution against one or more policies in the sandbox. It is understood that the transformation step 376 may be omitted in embodiments, and the code is passed directly as retrieved by the mail agent to the sandbox.

Figure 9:
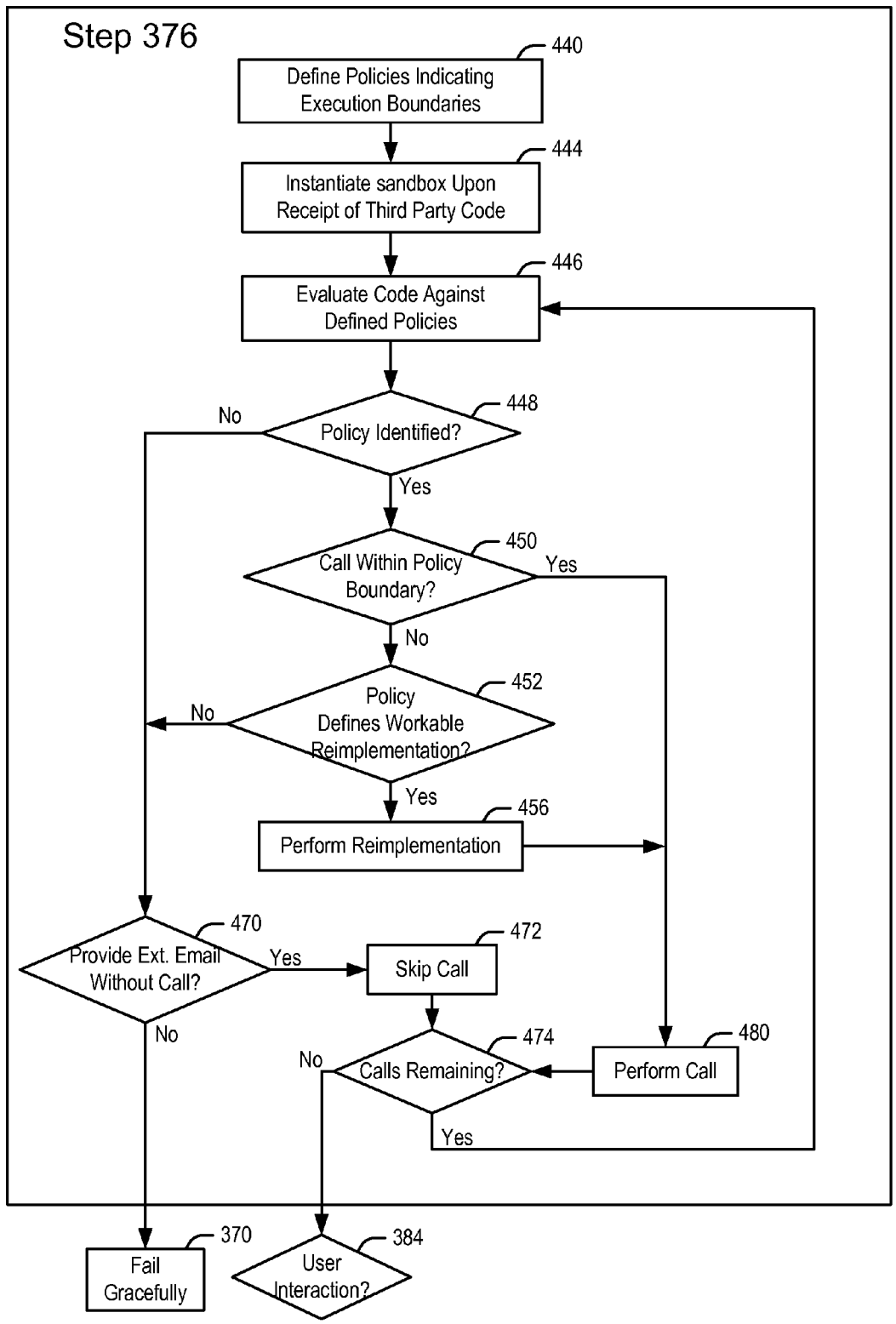
FIG. 9 is a more detailed flowchart of the steps for examining and running received code within a secure sandbox on the service provider.

An example of the operation of the sandbox 66 in step 376 is explained in greater detail with respect to the flowchart of FIG. 9. In step 440, policies are defined for the policy agent. These policies may for example be defined manually by a system administrator for service provider 60. Each defined policy indicates an execution boundary for a function sought to be performed by the fetched code. There are a wide variety of functions or API calls which can be made, and there may be a policy for each such function or API call (though there may be less policies than there are calls in further embodiments, and a single policy may be applied to more than one call in further embodiments).

Upon receipt by the mail user agent of third party code in step 372, the sandbox 66 is instantiated in step 444, and the code is passed to the sandbox. In step 446, the sandbox extracts the content of the code script, and attempts to match each operation sought to be performed by the code script to a defined policy in step 448. If no applicable policy is identified in step 448, the sandbox 66 determines in step 470 whether the extensible email can be provided without performing the unidentified operation. If so, the operation is skipped (step 472), and the sandbox 66 looks for any additional operations in the fetched code in step 474.

On the other hand, if an applicable policy is identified in step 448, the operation is evaluated against the execution boundary in the identified policy. In step 450, the sandbox 66 determines whether there is a defined policy for a given operation, and, if an applicable policy is found, the sandbox whether the operation is within the boundaries of the defined policy. If so, the operation is performed in step 480, and the sandbox 66 looks for any additional operations in the fetched code in step 474.

On the other hand, if step 450 determines that an operation is outside of a policy boundary, the sandbox 66 next determines in step 452 if there is a specified reimplementation that can be made for the call. If so, the reimplementation is made in step 456, and the reimplemented call is made in step 480. The dynamic reimplementation that may be made may include at least one of the following: augmenting the request before granting the request, replacing the request with another request and providing a substitute resolution in response to the other request, and requesting a user input from the user for granting or denying the request.

If however step 452 determines there is no reimplementation which can be applied to the out of bounds operation call, the sandbox 66 determines in step 470 whether the extensible email can be provided without performing the out of bounds operation. If so, the operation is skipped (step 472), and the sandbox 66 looks for any additional operations in the fetched code in step 474.

On the other hand, if the sandbox 66 determines in step 470 that the extensible email cannot be rendered without the out of bounds operation, the extensible email may then gracefully fail in step 370. In embodiments, the system administrator may specify which operations are not critical, and which operations cannot be skipped and result in a graceful failure if out of bounds. In further embodiments, step 470 may be skipped, and the email may gracefully fail any time there is an out of bounds operation for which no policy reimplementation is specified.

The third party code is examined and run all within the secure sandbox. This ensures that the third party code will not affect the service provider 60 or user computing system 50 while the sandbox examines and runs the code.

The above system of isolating third party code within a secure sandbox to run safely allows the present system to receive extensible emails from third party platforms from anywhere over the Internet. All authentication and validation of emails, and the operations of the sandbox 66, occur at the time an email is received or opened. With such a system, no pre-authorized third parties or sub-networks of approved third parties are required. As such, extensible emails may be received from anywhere on the Internet, dynamically authenticated and resolved, and then rendered with an interactive view in accordance with the procedures described above.

Referring again to FIG. 6, in step 380, the third party code is examined and run in the sandbox to generate the interactive view of the extensible email (assuming the email has not failed at any point). In step 384, the email user agent checks whether the user has interacted with the email, for example by selecting a link or adding data to an interactive form. If so, the email user agent itself may connect to the URL selected by the user to perform the requested interaction with the third party server. In particular, the email user agent 64 returns to step 368 to perform the authentication steps, the sandbox steps, etc.

In embodiments, the mail user agent may connect directly to the selected URL. As an alternative, the mail user agent may contact the selected URL via a proxy server, for example supported by the service provider 60. In such an embodiment, the proxy server may act as an intermediary between the mail user agent and the selected URL, receiving the request from the mail user agent, obtaining the content from the selected URL, transforming the content to run in a sandbox on the mail user agent as described above, and then passing the content to the mail user agent.

If no user interaction is detected, the mail user agent checks in step 386 if the user has closed the extensible email. If so, the mail agent 64 returns to step 360 to see if the user selects another email for viewing. When the user is done viewing his or her email, the user may exit the mail user agent 64 in step 390.

As indicated above, an extensible email may display more than one interactive view. In one embodiment (described above), a second interactive view may be created using the metadata tag "mail:lvname" following the "mail:lvsrc" URL in an earlier defined <DIV> section. However, it may also happen that two separate <DIV> sections are used to define two independent interactive views for an email. Such an example is shown in FIG. 10, which shows an HTML portion 500 of an email 502.

The HTML part 500 includes metadata 504 allowing the mail user agent 64 to obtain code and generate a first interactive view 520 (FIG. 11). The part 500 also includes static data 506 for creating fixed text and/or graphics in association with the first interactive view in the extensible email. The part 500 further includes metadata 508 in a second <DIV> section allowing the mail user agent 64 to obtain code and generate a second interactive view 524 (FIG. 11). The second <DIV> section may also have its own static data 510 for creating fixed text and/or graphics associated with the second interactive view in the extensible email.

In this example, as shown in FIG. 11, the third party platform is Netflix®. The first interactive view 520 is a movie rating view where a user is able to rate a movie from within the extensible email the user received. The second interactive view 524 shows real time data of how many movies that user has in his or her movie queue. The first interactive view 520 is generated when the mail user agent 64 of service provider 60 contacts a server at the Netflix® platform 70 at:
. . . netflix.com/ratemovie?id=123151token=s1gkah5sw
to obtain the code for the view 520. The second interactive view 524 is generated when the mail user agent 64 of service provider 60 contacts a server at the Netflix® platform 70 at:
. . . netflix.com/queue?id=123151token=s1gkah5sw
to obtain the code for the view 524. The content, styles and presentation is all taken from the code retrieved from the third party servers, in this case Netflix®.

As indicated above, any third party platform may generate extensible emails for sending to users of any service provider in embodiments of the invention. As a few examples, different third party platforms 70 may use the metadata scheme described above to generate extensible emails for viewing, adding or commenting on online photo albums or videos. The extensible email may be from a social network, allowing a user to view and comment on friends' profiles, and accept, decline and send invitations. The extensible email may be from an online shopping platform, allowing a user to make and review purchases, view account and shipping information, bid on auction items, read product reviews and ratings, get real-time pricing and availability, add products to a wish list, etc. The extensible email may be from an airline or travel agent, allowing a user to review or purchase travel reservations, or receive flight arrival/departure information. These are only a few specific examples, and as indicated above, there may be at least as many different extensible emails as there are domains on the Internet.

As explained above, interactive emails may be generated when an email is opened. However, in further embodiments, interactive emails may be generated at the time the email is received at the service provider. Thus, when an email is received at the service provider, the email user agent will determine whether the email has interactive content at that time. In a further alternative embodiment, it is contemplated that some interactive content may be cached to make the experience faster and also reduce load on the third party platforms.

The foregoing detailed description of the system has been presented for purposes of illustration and description. It is not intended to be exhaustive or to limit the system to the precise form disclosed. Many modifications and variations are possible in light of the above teaching. The described embodiments were chosen in order to best explain the principles of the system and its practical application to thereby enable others skilled in the art to best utilize the system in various embodiments and with various modifications as are suited to the particular use contemplated. It is intended that the scope of the system be defined by the claims appended hereto.

What is claimed is:

1. A method of presenting extensible emails from a third party to a user, comprising the steps of:
   (a) receiving an extensible email from the third party via a service provider which provides email service to the user, the extensible email including metadata listing a URL of a server controlled by the third party, the URL having code for generating an interactive view for the email;
   (b) checking whether the URL points to a web address inside a firewall of the service provider;
   (c) if the URL points to a web address inside the firewall of the service provider, taking no action with respect to accessing the URL;
   (d) if the URL points to a web address outside of the firewall of the service provider, fetching the code from the URL listed in the metadata in response to interacting with the email received in said step (a); and
   (e) if the URL points to a web address outside of the firewall of the service provider, running the code to generate an interactive view in the email, including the step of running the code in a secure sandbox which isolates the code and prevents the code from adversely affecting at least one of the service provider presenting the extensible email and a user receiving the extensible email.

2. The method recited in claim 1, said step (a) comprising the step of receiving markup language that describes the URL, an expiration date by which the code at the URL may be fetched, and authorization options dictating whether there is authorization to fetch the code.

3. The method recited in claim 1, further comprising the step of comparing the portion of the code against one or more predefined policies regarding execution boundaries for the code to determine whether the portion of the code will adversely affect a service provider presenting the extensible email or a user receiving the extensible email.

4. The method recited in claim 1, further comprising the step of rendering a static view together with the interactive view in the extensible email, the static view being defined in the metadata of the extensible email received in said step (a).

5. The method recited in claim 1, further comprising the step of authenticating at least one of the URL and the domain specified in the URL before said step (d) of fetching the code.

6. The method recited in claim 1, further comprising the step of checking for an expiration date in the metadata of the email received in said step (a), and not fetching the code in said step (d) if the expiration date has passed.

7. A method of presenting extensible emails from a third party to a user, comprising the steps of:
 (a) receiving an extensible email from the third party including a URL for a server under control of the third party with code for generating an interactive view for the email containing interactive content designated by the third party;
 (b) checking whether the URL points to a web address inside a firewall of the service provider;
 (c) if the URL points to a web address inside the firewall of the service provider, taking no action with respect to accessing the URL;
 (d) if the URL points to a web address outside of the firewall of the service provider, fetching the code from the URL listed in the email upon receiving indication of an interaction with the extensible email;
 (e) if the code from the URL is fetched in said step (d), applying one or more policies to the code fetched in said step (d) to determine if any portion of the code attempts to operate beyond a boundary defined by the one or more policies, skipping a first code step if no policy is identified covering the first code step, and reimplementing a second code step where a policy indicates the second code step is outside of a policy boundary, said reimplementing step comprising at least one of:
  (i) augmenting a request of the second code step before granting the request,
  (ii) replacing a request with another request, or
  (iii) requesting a user input from the user for granting or denying a request;
 (f) if the code from the URL is fetched in said step (d), generating a virtual machine; and
 (g) if the code from the URL is fetched in said step (d), running the code fetched in said step (d), subject to the application of the one or more policies in said step (e), in the virtual machine generated in said step (f) to generate an interactive view in the extensible email.

8. The method of claim 7, wherein said steps (f) and (g) isolate the code and prevent the code from doing harm to a system performing the method.

9. The method of claim 7, further comprising the step of performing at least one authentication process to authenticate the validity of the third party.

10. The method of claim 7, the step (a) of receiving an extensible email including a URL comprises the step of receiving the URL embedded within metadata in an HTML portion of the extensible email.

11. The method recited in claim 10, further comprising the step of rendering a static view together with the interactive view in the extensible email, the static view being defined in the metadata of the extensible email received in said step (a).

* * * * *